United States Patent [19]

Baumgartner et al.

[11] Patent Number: 5,582,273
[45] Date of Patent: Dec. 10, 1996

[54] COMPRESSED-AIR DISC BRAKE

[75] Inventors: Hans Baumgartner, Moosburg; Dieter Bicker, Munich, both of Germany

[73] Assignee: Knorr-Bremse Systeme Fuer Nutzfahrzeuge, Munich, Germany

[21] Appl. No.: 494,248

[22] PCT Filed: Jan. 27, 1994

[86] PCT No.: PCT/DE94/00061

§ 371 Date: Jun. 23, 1995

§ 102(e) Date: Jun. 23, 1995

[87] PCT Pub. No.: WO94/21936

PCT Pub. Date: Sep. 29, 1994

[30] Foreign Application Priority Data

Mar. 18, 1993 [DE] Germany .......................... 43 08 704.3

[51] Int. Cl.[6] .............................. F16D 65/20; F16D 65/52; F16D 65/16; F16D 65/56
[52] U.S. Cl. ............ 188/72.6; 188/106 F; 188/72.9; 188/71.8; 188/196 BA
[58] Field of Search ............................ 188/72.6, 72.7, 188/72.9, 71.8, 71.9, 196 BA, 79.55, 73.45, 106 F, 72.8, 217, 72.1, 72.4

[56] References Cited

U.S. PATENT DOCUMENTS 5,343,984  9/1994  Bicker et al. .
5,353,896  10/1994  Baumgartner et al. .
5,379,867  1/1995  Macke et al. .................... 188/72.9
5,400,875  3/1995  Anthony et al. ............... 188/106 F X
5,433,298  7/1995  Antony et al. .................... 188/72.7
5,439,078  8/1995  Baumgartner et al. ........... 188/73.45
5,449,052  9/1995  Macke et al. .................. 188/72.7 X

FOREIGN PATENT DOCUMENTS

0569031  11/1993  European Pat. Off. .
3536562  4/1987  Germany .
3716202  11/1988  Germany .
4032885  4/1992  Germany .
4212384  10/1993  Germany .

Primary Examiner—Douglas C. Butler
Attorney, Agent, or Firm—Barnes & Thornburg

[57] ABSTRACT

An application device for a compressed-air-operated disc brake with a turn lever, an eccentric and two parallel male-threaded adjusting spindles, each of which acts via a pressure member on a brake pad and which are coupled together rotationally fixed via a synchronising device, in which an axially movable adjusting device is arranged to be integral in rotation in at least one adjusting spindle and, at every actuation of the turn lever, exerts an adjusting torque on the appropriate adjusting spindle which the synchronising device transmits to an adjuster or an actuator in the other adjusting spindle. The synchronising device is a shaft running in the region of the axis of the eccentric having a bevel gear on each face which meshes with a corresponding bevel gear of the adjusting device or the actuator.

14 Claims, 6 Drawing Sheets

COMPRESSED-AIR DISC BRAKE

This application is filed under 35 U.S.C. 371 in order to enter into the U.S. national stage under PCT based upon the international application filed Jan. 27, 1994 as PCT/DE94/ 00061.

SUMMARY AND BACKGROUND OF THE INVENTION

The present invention relates to a compressed-air-operated disc brake, in general and more particularly for use in commercial road vehicles.

Compressed-air-operated or pneumatic disc brakes of the above-mentioned type are known, for example, from German Patent Documents DE-OS 37 16 202, DE-OS 40 32 885 as well as DE-OS 42 12 384 which is not a prior publication. In the case of these known disc brakes, a caliper reaches around the brake disc, which caliper is disposed so that it can be displaced in the axial direction. On one side of the caliper, a compressed-air-operated application device is arranged during whose operation a brake shoe situated on this side of the brake disc is pressed against the friction surface of the brake disc. Whereupon, the caliper is displaced in the opposite direction because of the reaction forces and, as a result, a brake shoe situated on the opposite side also presses against the brake disc.

In the case of these known disc brakes, the application device has a rotary lever as an actuating element which is disposed so that it can be swivelled about an axis of rotation extending in parallel to the plane of the brake disc. On its side facing the brake disc, the rotary lever rests by means of an eccentric approximately in the longitudinal center on a transverse element which extends in parallel to the axis of rotation. The traverse element is displaceably guided with respect to the brake disc. Two adjusting spindles, which are provided with an external thread, are adjustably screwed in a parallel arrangement in a respective assigned internal thread of the transverse member. Because of the use of two adjusting spindles, such an application device is also called a "two-spindle" application device.

The two adjusting spindles each include of a pressure member disposed on their brake-disc-side end upon the brake shoe which is disposed on the application side in the caliper so that the caliper can be displaced with respect to the brake disc. By at least one adjusting device which is coupled in an axially displaceable but non-rotatable manner with one of the two adjusting spindles and, during each actuation of the rotary lever, acts by way of a sliding clutch on the respective adjusting spindle, the ventilating play, which changes because of the wear of the lining, maintains its correct desired value in a constant manner. The rotation of the mentioned adjusting spindle which is caused by the adjusting device in the case of a lining wear, is transmitted by a synchronizing device to the other adjusting spindle such a that this adjusting spindle is rotated by the same angle and therefore reduces its distance from the brake disc by precisely the same distance.

In the simplest case, only one actuator is arranged in the above-mentioned second adjusting spindle, which actuator couples this adjusting spindle in a non-rotatable manner with the synchronizing device. The actuator may be constructed, for example, of a gear wheel which meshes in an internal toothing of the adjusting spindle and which is coupled with the synchronizing device by a shaft. However, for the second adjusting spindle, a separate adjusting device may also be provided. In this case, twice as much adjusting forces is achievable, but with correspondingly higher manufacturing costs. Also when two adjusting devices are used, a synchronizing device will still be necessary because an exactly synchronous method of operation of both adjusters will still be absolutely required for ensuring a uniform abrasion of the brake lining and prevent the occurrence of a circumferential diagonal wear, that is, the non-uniform wear of the brake linings in the tangential or circumferential direction of the brake disc.

In the currently most customary embodiment, the synchronizing device of the known application devices consists of a toothed belt or a link chain coupled with a gear wheel of the adjusting device and another gear wheel of the actuator or of the other adjusting device so that a belt wrap transmission is formed. As an alternative, it is also known to replace the toothed belt or the link chain by an uneven number of interposed gear wheels. However, because of the numerous required bearings, this solutions results in high expenditures and is therefore correspondingly expensive.

The gear wheels, which are coupled with the respective adjusting device and/or actuator, are provided in customary embodiments on the end of these function elements which faces away from the brake disc so that an "exterior" synchronizing device is formed. Although such an exterior synchronizing device permits a very good access and therefore an easier maintenance, several additional covering components are required. This increase the manufacturing costs and, on the other hand, clearly increase the risk of a leakiness of the housing, which must be prevented in every case and is caused by the additional sealing points.

Therefore, for avoiding these problems, "interior" synchronizing devices have also been taken into consideration. The gear wheels of the adjusting device and/or of the actuator as well as the toothed belt or the chain are arranged approximately at the level of the eccentric of the transverse member. However, in this functionally important area of the application device, this arrangement creates considerable space problems so that an enlargement of the housing dimensions may be unavoidable. Furthermore, the maintenance is considerably more difficult than in the case of an exterior arrangement of the synchronizing device.

It is an object of the invention to provide a compressed-air-operated disc brake whose synchronizing device is distinguished by a space-saving construction and high serviceability while avoiding any leakage problems.

According to the invention, this synchronizing device therefore consists of a shaft which extends essentially in the area of the axis of the eccentric and which has a bevel gear on each face which meshes with a corresponding bevel gear of the adjusting device or actuator so that a corresponding angle drive is formed. This shaft, which replaces the toothed belts or link chains customary in the state of the art, requires no additional space so that the synchronizing device can be installed without any significant influence on the space conditions in the interior of the application device. Furthermore, the shaft is constructively simpler than a toothed belt or a link chain so that, just for this reason, servicing operations will be required much less frequently. Finally, no leakage problems are caused by the arrangement of the synchronizing device according to the invention.

If, corresponding to the first embodiment of the above-mentioned German Patent Documents DE-OS 42 12 384, the complete content of which is, incorporated herein by reference the eccentric of the application device is formed by a roller which rests in the transverse and in the rotary lever in a respective shell-shaped bearing surface, it is particularly advantageous for this eccentric roller to be simultaneously used as the shaft of the synchronizing device. The reason is that the synchronizing device can then be produced in an extremely cost-effective manner because the eccentric roller must only be modified by providing corresponding bevel gears which—a one-piece construction with the eccentric roller. Otherwise, only the two bevel gears are required for the adjusting device or the actuator.

This embodiment of the synchronizing device according to the invention is also distinguished by two other advantages: On the one hand, in the preferred embodiment, the lateral bevel gears protrude by a certain distance so that an axial securing of the eccentric roller on the traverse member is achieved. On the other hand, any undesirable change of the position of the two adjusting spindles, which is the result of vibrations or the like, is reliably prevented by the eccentric shaft, specifically without the requirement of an additional braking device. This positive effects is a result of the fact that, also in the inoperative condition of the brake, the transverse is prestressed by a pressure spring in the direction of the rotary lever so that the eccentric shaft is prevented, by corresponding friction forces from carrying out an automatic rotation. Nevertheless, the adjusting torque exercised on the adjusting device is completely sufficient at any time for overcoming these friction forces so that the eccentric roller operating as the synchronizing device, does not impair the reliable adjustment. It is only when the ventilating play of both brake shoes is completely overcome, that so much force is applied that the eccentric roller can no longer be rotated because the transverse-side bearing surface has a much higher coefficient of friction than the lever-side bearing surface. However, at this point in time, no adjusting movement is desired and this effect is more an advantage then a disadvantage.

If nevertheless a complete decoupling of the synchronizing device from any friction forces should be desired, or if these has advantages for other reasons, the eccentric roller may be constructed as a tube-shaped part whose internal bore is used as a bearing of a correspondingly constructed shaft on whose faces one bevel gear respectively is fastened, for example, by screwing.

If, corresponding to the additional embodiments of the above-mentioned German Patent Document DE-OS 42 12 384, the eccentric of the application device is, in contrast, constructed in one piece with the traverse or with the rotary lever, a longitudinal bore is formed in the eccentric which is used for the bearing of the shaft of the synchronizing device. Operationally, this type of construction or bearing corresponds to the above-explained use of a hollow roller for the eccentric disposed on both sides.

If permitted by the installation space and particularly by the implementable diameter of the eccentric constructed in one piece with the traverse or with the rotary lever as well as by the respective diameter of the synchronizing shaft, it may be advantageous to arrange the longitudinal bore eccentrically with respect to the longitudinal axis of the eccentric, specifically in a preferred manner concentrically with respect to the axis of rotation of the rotary lever. This measure has the advantage that, when the rotary lever is actuated, the synchronizing shaft disposed in this longitudinal bore will hardly or not at all change its axial relative position with respect to the bevel gears of the adjusting device or the actuator. As a result, these bevel gears will continue to mesh with those of the shaft even if the transverse member and therefore the eccentric move toward the brake disc when the rotary lever is actuated.

It should be pointed out, however, that, as proven in tests, such a partial reduction of the mutual meshing of the bevel gears forming the angle drive is not important in practice, in the case of a suitable dimensioning. This is because an adjustment which may already be initiated by the adjusting device will be transmitted to the other adjusting spindle no later than when the traverse member rerotarys into its inoperative position 4 since then the bevel gears will then again be in a complete engagement. Thus, this effect also causes no problem in the case of the above-described synchronizing devices since the synchronizing movement is transmitted by the eccentric roller or a shaft disposed in this roller and no such displacement of the axis of rotation of the shaft can be implemented.

Nevertheless, a continuously good meshing of the bevel gears can also be achieved in the case of such a shifting of the location of the axis of the synchronizing shaft (eccentric roller or shaft disposed in it) if the bevel gears of the adjusting device or of the actuator are fastened to it in an axially displaceable manner so that, possibly with the additional use of a spring element, a following of these bevel gears can be achieved with respect to those of the shaft.

Additional further developments of the invention may, for example, be the additional use of a slide bearing for the synchronizing shaft the use of plastic material for the bevel gears.

In the following the invention will now be explained in detail by the description of embodiments with reference to the drawing.

DETAILED DESCRIPTION OF THE PREFERRED EMBODIMENT

In order to demonstrate the problems on which the invention is based, the basic construction and the method of operation of the disc brake of the above-mentioned type and of its application device will be explained in detail.

Figure 1:
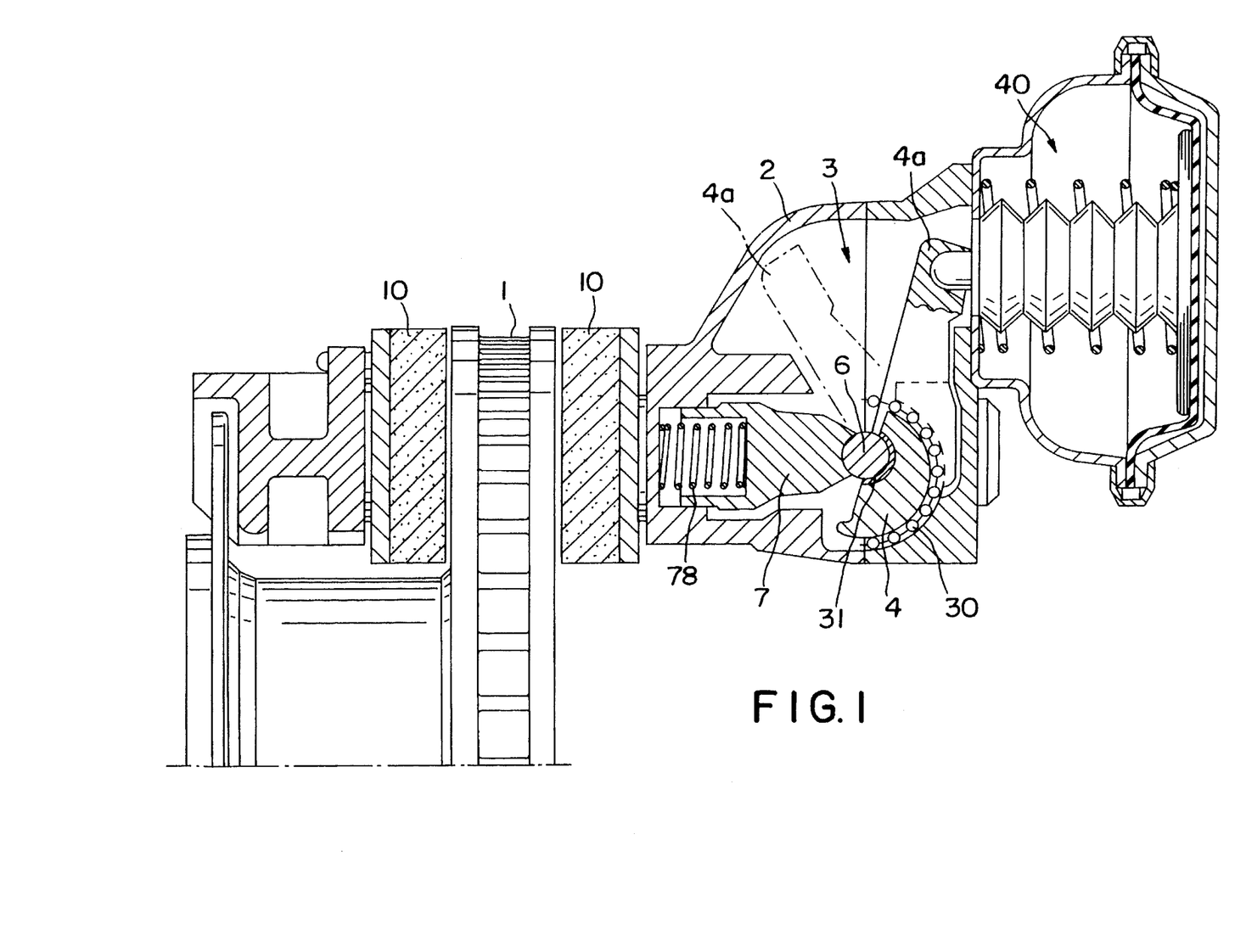
FIG. 1 is a cross-sectional view of the schematic construction of the application device with an eccentric constructed as a roller.
Figure 2:
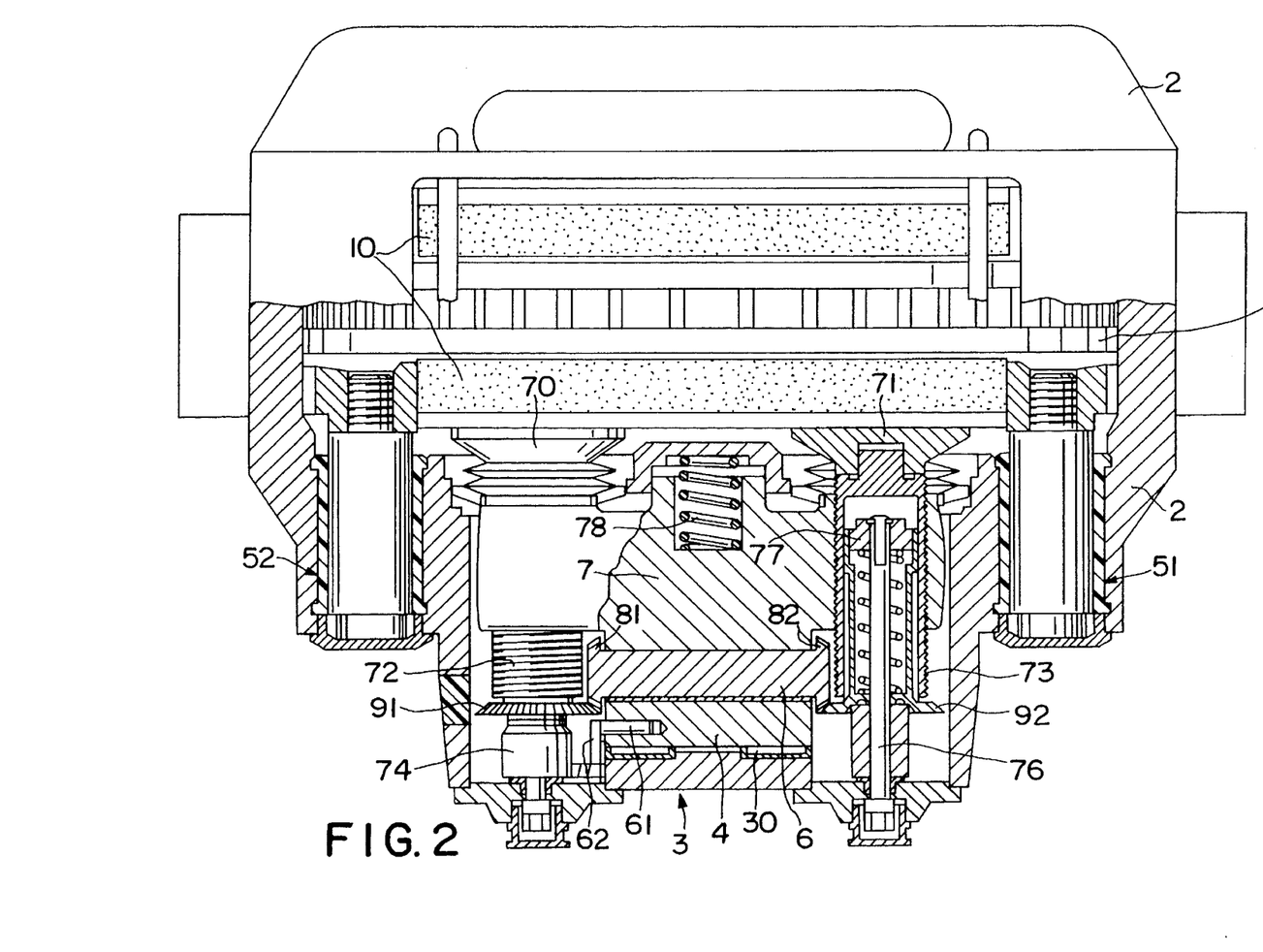
FIG. 2 is a longitudinal sectional view of the application device illustrated in FIG. 1.
Figure 4:
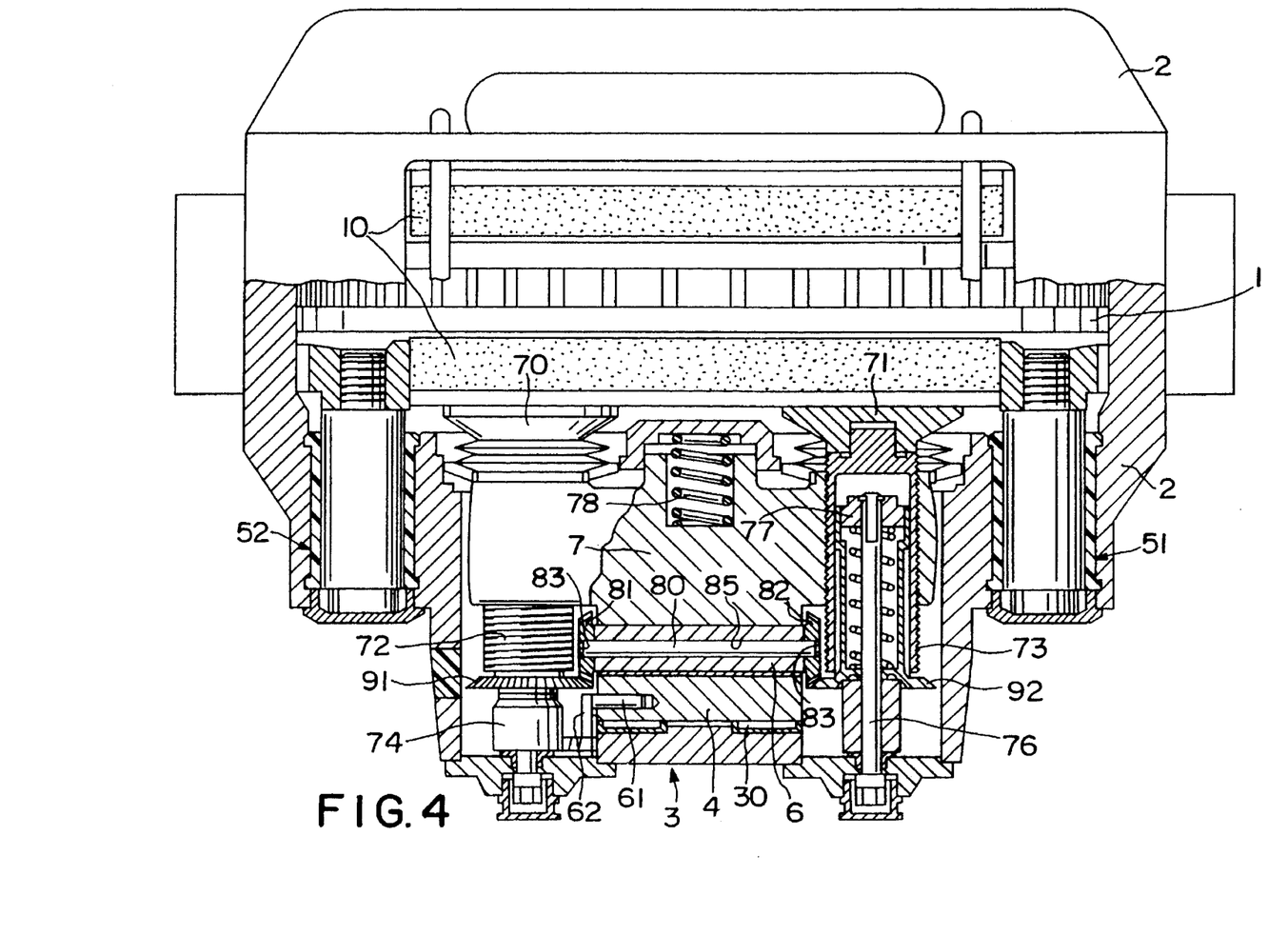
FIG. 4 is another longitudinal sectional view of the application device illustrated in FIG. 1 with an alternative embodiment of the synchronizing device according to the invention.

As illustrated in FIGS. 1, 2 and 4, an internally ventilated disc brake 1 which is fastened on an axle of a commercial vehicle which is not shown in detail, is surrounded by a caliper 2. According to FIG. 2, the caliper 2 is disposed by a rigid guide bearing 52 as well as by means of a compensating bearing 51 to be axially displaceable with respect to the brake disc 1 on the vehicle. The construction and the function of the caliper are otherwise known and do not have to be explained in detail.

On the side of the brake disc 1 which is on the right in FIG. 1 and on the side of the brake disc which is on the bottom in FIGS. 2 and 4, a two-spindle application device is arranged which schematically has the reference number 3. In the caliper 2, an essentially semicircular pivot bearing 30 is provided whose axis of rotation extends in parallel to the plane of the brake disc 1 incorporating the principles of the present invention and which receives the correspondingly rounded area of the rotary lever 4 so that the rotary lever 4 can be swivelled in parallel to the brake disc 1. For actuating the rotary lever 4, a brake cylinder 40 is provided which is shown only schematically. A piston of the brake cylinder and engages in a suitably formed recess of an actuating arm 4a of the rotary lever 4. When the brake cylinder 40 is acted upon by compressed air, the actuating arm 4a of the rotary lever 4 is therefore moved from its inoperative position into the position indicated in FIG. 1 by a broken line. It should be noted that the actuating of the rotary lever 4 can naturally also take place by a brake linkage so that the brake cylinder 40 may possibly be situated at a different location if the installation space for the brake disc is limited.

The side of the rotary lever 4, which faces away from the half-shell-shaped pivot bearing 30, is coupled, by way of the eccentric 6 serving as a cam, with a transverse member 7 which extends inside the caliper 2 essentially in parallel to the axis of rotation of the brake disc 1 and is displaceably disposed in this plane. On its end facing the brake disc 1, the transverse member 7 has a blind-hole-type recess which is surrounded by a tube-type projection projecting in the direction of the brake disc 1. This projection of the transverse 7 is slidably disposed in a corresponding recess of the caliper 2 at a right angle with respect to the plane of the brake disc 1 while maintaining such a play that the traverse member 7 can carry out slight swivel movements in the plane of the drawing. Inside the recess, a spiral spring 78 is arranged which is clamped in between the transverse 7 and the end of the caliper 2 facing the brake disc and as a result prestresses the traverse member 7 in the direction of the rotary lever 4.

As illustrated particularly in the longitudinal sectional views of FIGS. 2 and 4, the traverse member 7 has a pair of bores having an internal thread and one adjusting spindle 72 and 73 respectively is screwed into one of the bores in an adjustable manner by, the external thread of the adjusting spindle. On the end of each of the adjusting spindles 72 and 73 which faces the brake disc 1, a pressure member 70 and 71 is fastened which widens in a conical manner. Since, the two adjusting spindles 72 and 73 extend perpendicularly to the plane of the brake disc 1, the pressure members 70 and 71 rest with their flat ends against a brake shoe 10. Particularly in the circumferential direction with respect to the brake disc 1, the brake shoe 10 is slidably guided transversely with respect to the brake disc 1 by holding devices which are not shown. The holding devices may be assigned either to the caliper 2 or to a brake anchor plate.

In the interior of the adjusting spindle 72, an adjusting device 74 is arranged which, because of an axial toothing, is non-rotatably coupled with the adjusting spindle 72 and can be displaced in the axial direction. The precise construction of a preferred embodiment of the adjusting device is described in the applicant's German Patent Document DE-OS 40 34 165 and corresponding U.S. Pat. No. 5.353.890 so that with respect to details reference is made to the full content of that document.

During each actuating of the rotary lever 4, the adjusting device 74 is rotated by a certain angular amount, whereby a continuous adjusting of the brake is ensured. This rotation of the adjusting device 74 is advantageously achieved, for example, by two pins 61 which are constructed on the rotary lever 4 in a radially projecting manner and which are offset with respect to one another by a slight angular amount and whose ends engage in corresponding recesses of a driving lever 62 of the adjusting device 74. The precise construction of such a rotary drive device for the adjusting device is described in the applicant's German Patent Document DE-OS 42 04 307 so that with respect to details, reference is made to the full content of that document. However, it should be pointed out that the type of rotary drive of the adjusting device is not important with respect to the invention. It is only important that, during each operation of the brake, a sufficiently high adjusting torque is generated and transmitted to the adjusting device 74.

In the interior of the opposite adjusting spindle 73, no adjusting device but only an actuator is arranged. The actuator includes a gear wheel 77 which engages in a corresponding axial toothing of the adjusting spindle 73 and is fastened to a shaft 76 which is disposed in the housing, as illustrated clearly in FIG. 2. As explained initially, it is possible as an alternative to provide in the adjusting spindle 73 also an adjusting device which corresponds to the adjusting device 74 which may have the advantage that the overall adjusting torque can be doubled. However, this solution makes the application device more expensive so that preferably the described actuator will be used.

Figure 3:
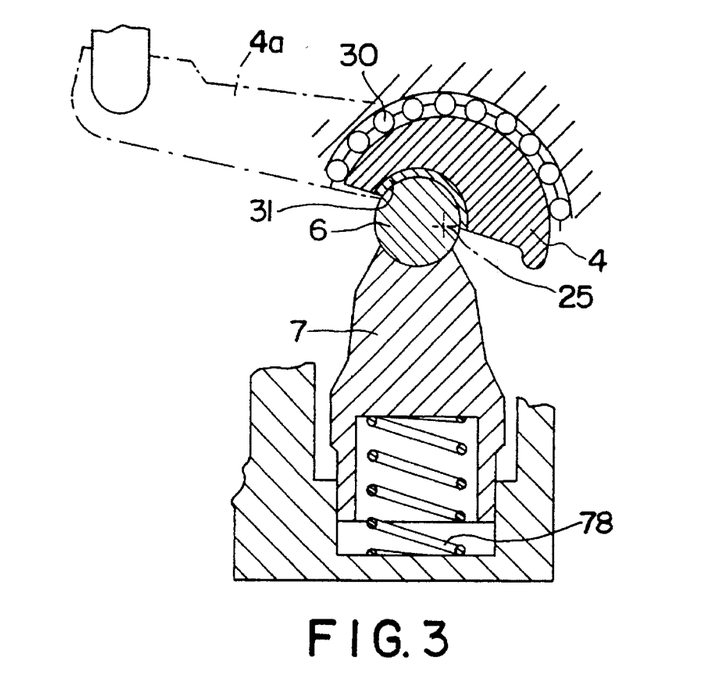
FIG. 3 is a view of the lever mechanism and of the synchronizing device arranged therein on the basis of a partial cross-sectional view of FIG. 2.

As illustrated, for example, in FIG. 2, a bevel gear 91 is non-rotatably coupled with the adjusting device 74, in which case, as will be explained in the following, an axial displaceability of the bevel gear 91 may be provided. The shaft 76 of the actuator of the other adjusting spindle 73 also has a non-rotatably coupled and possibly axially displaceable bevel gear 92. Both bevel gears 91 and 92 mesh with the teeth of a bevel gear 81 or the bevel gears 81,82 in the embodiment of FIG. 2 and 3, are mounted on the faces of the eccentric 6 (possibly in one piece) while, in the embodiments of FIGS. 4 to 8, a shaft 80 is disposed in a longitudinal bore 85 and the bevel gears 81 and 82 are fastened on their ends, for example, by a screwed connection or in a different manner (for example, by being shrunk on). By means of the bevel gears 81 and 91 as well as 82 and 92, one angle drive respectively is formed so that, by way of the eccentric 6 or the shaft 80, the adjusting device 74 is non-rotatably coupled with the actuator of the adjusting spindle 73. The adjusting spindle 73 is therefore rotated synchronously with the adjusting spindle 72 so that the bevel gears 81, 82, 91 and 92 as well as the eccentric 6 and the shaft 80 form the synchronizing device according to the invention.

For a better understanding of the method of operation of the synchronizing device according to the invention, the operating principle of the application device will be briefly explained in the following.

When the brake cylinder 40 is acted upon by compressed air, the actuating arm 4a, according to FIG. 1 is swivelled to the left, whereby the eccentric 6 operating on the rotary lever 4 is also displaced to the left by a distance which is reduced corresponding to the lever principles. The transverse member 7 is therefore pressed against the prestressing force of the spiral spring 78 by this distance in the direction of the brake disc 1. The pressure members 70 and 71, which are fastened on the transverse member 7 by the adjusting spindles 72 and 73, therefore, while overcoming the ventilating play (which in practice amounts to approximately 0.4 mm), press the brake shoe 10 against the brake disc 1. When the actuating arm 4a is swivelled farther to the left, the caliper, because of the force exercised on the brake disc 1 in FIG. 1, is displaced to the right so that finally the left brake shoe 10 is also pressed against the brake disc 1. Since the external thread of the adjusting spindles 72 and 74 and the respective assigned internal thread of the transverse member 7 are dimensioned such that, in the pressure-admitted condition, a self-locking occurs against the application direction, the adjusting spindles cannot move into this direction. Thus, the brake pressure will be maintained until the rotary lever 4 is released.

When, in the course of the above-explained application operation, the two brake shoes 10 were displaced by a predetermined distance corresponding to the desired ventilating play, the adjusting device 74 is actuated by the rotary lever 4. If the ventilating play is adjusted correctly, the two brake shoes 10 will rest against the brake disc 1 at this point in time. As a result, a sliding clutch, which is provided in the adjusting device 74, will respond so that the adjusting spindle 72 and the adjusting spindle 73 synchronized with it are not adjusted. If, in contrast, there is an excessive ventilating play, which occurs, for example, after a change of linings or in the case of an increasing wear of the brake shoes, the adjusting spindle 72 and 73 are rotated by a certain distance by the adjusting device 74 and therefore bring the ventilating play to the desired value, possibly after a repeated operating of the brake. In this manner, it is ensured that the disc brake according to the invention remains operable up to a complete abrasion of the brake shoes 10.

The first embodiment of the synchronizing device according to the invention, illustrated in of FIGS. 2 and 3, transmits the adjusting rotating movement of the adjusting device 74 by the eccentric 6 serving as the force transmitting shaft (which in the present example therefore forms an eccentric roller) onto the adjusting spindle 73. Since, according to the above description, when an abrasion of the brake shoes exists which must be compensated, an adjusting moment occurs even before the brake shoes 10 rest against the brake disc 1. At the point in time of the desired synchronization, the eccentric roller 6 is pressed into the half-shell-shaped bearing of the transverse member 7 only by the force of the spring 78. The friction force which exists in this case can be overcome by the adjusting device 74 without any response of the sliding clutch arranged in the adjusting device 74. Only when the brake shoes 10 rest against the brake disc 1 does this friction force become so high that the eccentric roller 6 can no longer be rotated. In which case, the sliding clutch will respond anyhow at this point in time, as explained above. In the inoperative condition of the brake or of the rotary lever 4, the friction force generated by the spring 78 also acts upon the eccentric roller 6 so that any rotation of the adjusting spindles 72 and 73 by angle drives and the adjusting device 74 or the actuator is blocked. However, this effect is advantageous because it is vibrations which may occur during the driving operation are not capable of causing an undesirable rotation of the adjusting spindles 72 and 73 and therefore a change of the adjusted value of the ventilating play. Thus, by means of this embodiment of the synchronizing device, a locking device can be saved which may be required in the state of the art in the case of the occurrence of vibrations.

As illustrated in FIG. 3, because of the required eccentricity, the center of the eccentric roller is displaced by a certain distance from the rotating point of the rotary lever 4 which has the reference number 25. Therefore, when the rotary lever 4 is actuated, the point of rotation of the eccentric roller is displaced in the same manner as the transverse member 7 so that the teeth of the bevel gears 81 and 82 slide by a corresponding amount out of the teeth of the bevel gears 91 and 92 if these bevel gears 91 and 92 are fixedly connected with the adjusting device 74 or the actuator. However, such a partial reduction of the mutual meshing of the bevel gears forming the angle drive will present no problem in the case of the appropriate dimensioning of all functional groups. This is because an adjusting, which may already have been initiated by the adjusting device 74, will be transmitted to the other adjusting spindle 73 no later than when the traverse member 7 moves back into its inoperative position, after the end of the corresponding braking operation, since then the bevel gears will again be in a complete engagement. In addition, by a suitable shaping of the teeth of the bevel gears, a transmission of force takes place, even when there is an only partial engagement. Furthermore, despite this displacement of the location of the axis of the synchronizing shaft or of the eccentric roller 6, a continuously good meshing of the bevel gears can be achieved if the bevel gears of the adjusting device 74 or of the actuator are each fastened in an axially displaceable manner so that, possibly with the additional use of a (not shown) spring element these bevel gears follow those of the eccentric roller 6.

Concerning this first embodiment of the synchronizing device, it should be noted that the bevel gears 81 and 82 may be constructed in one piece with the eccentric 6. However, should it be more advantageous with respect to manufacturing techniques, it may also be considered to fasten corresponding bevel gears by screwing 83 or in a different manner to the face-side ends of the eccentric 6. In this context, it should also be noted that, in practice, the bevel gears 81 and 82 have a larger diameter than the eccentric 6 so that the bevel gears 81 and 82 protrude by a corresponding amount. As a result, the eccentric 6 is laterally secured, which is advantageous in any case.

Figure 5:
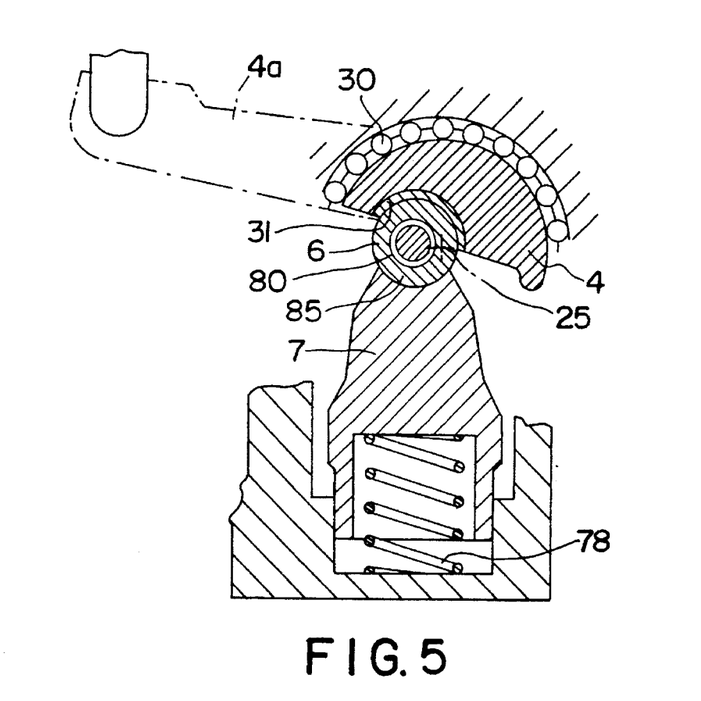
FIG. 5 is a view of the lever mechanism and the synchronizing device arranged therein on the basis of a partial cross-sectional view of FIG. 4.

FIGS. 4 and 5 show an alternative embodiment of the synchronizing device in the case of which the eccentric roller does not transmit the synchronizing torque by itself but by a shaft 80 disposed in it, as can easily be recognized in the figures. This embodiment differs from the preceding one in its method of operation only because of the fact that the transmission of the synchronizing torque is not impaired or completely blocked by friction forces at any point in time so that it can be used particularly for those applications where these characteristics are required. Also in the case of this embodiment, the providing of an axial displaceability of the bevel gears 91 and 92 may possibly be taken into consideration if a continuously good meshing of the bevel gears is required.

Figure 6:
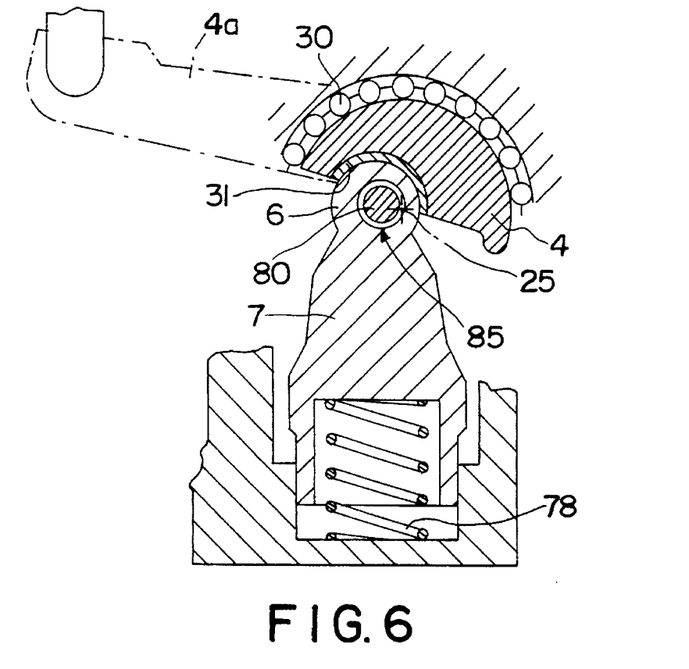
FIGS. 6, 7 and 8 are views of the arrangement of the synchronizing device in the case of an embodiment of the application device with an eccentric constructed in one piece.
Figure 7:
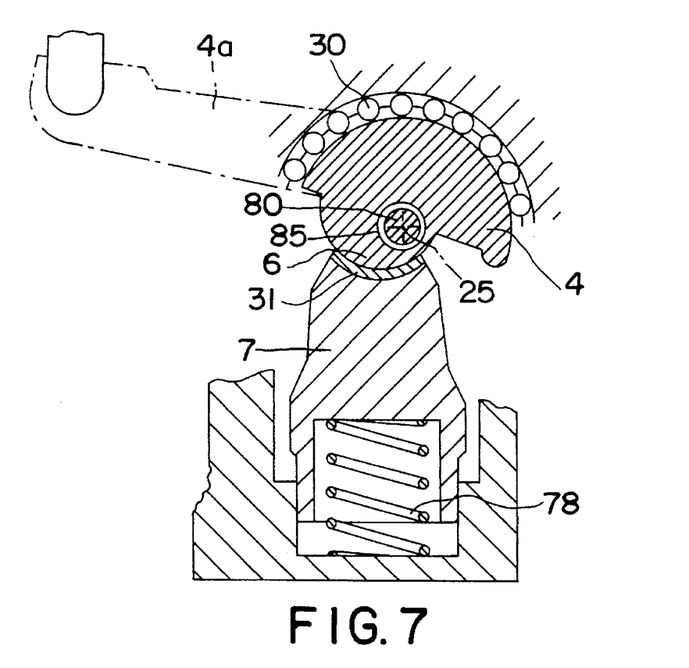
Figure 8:
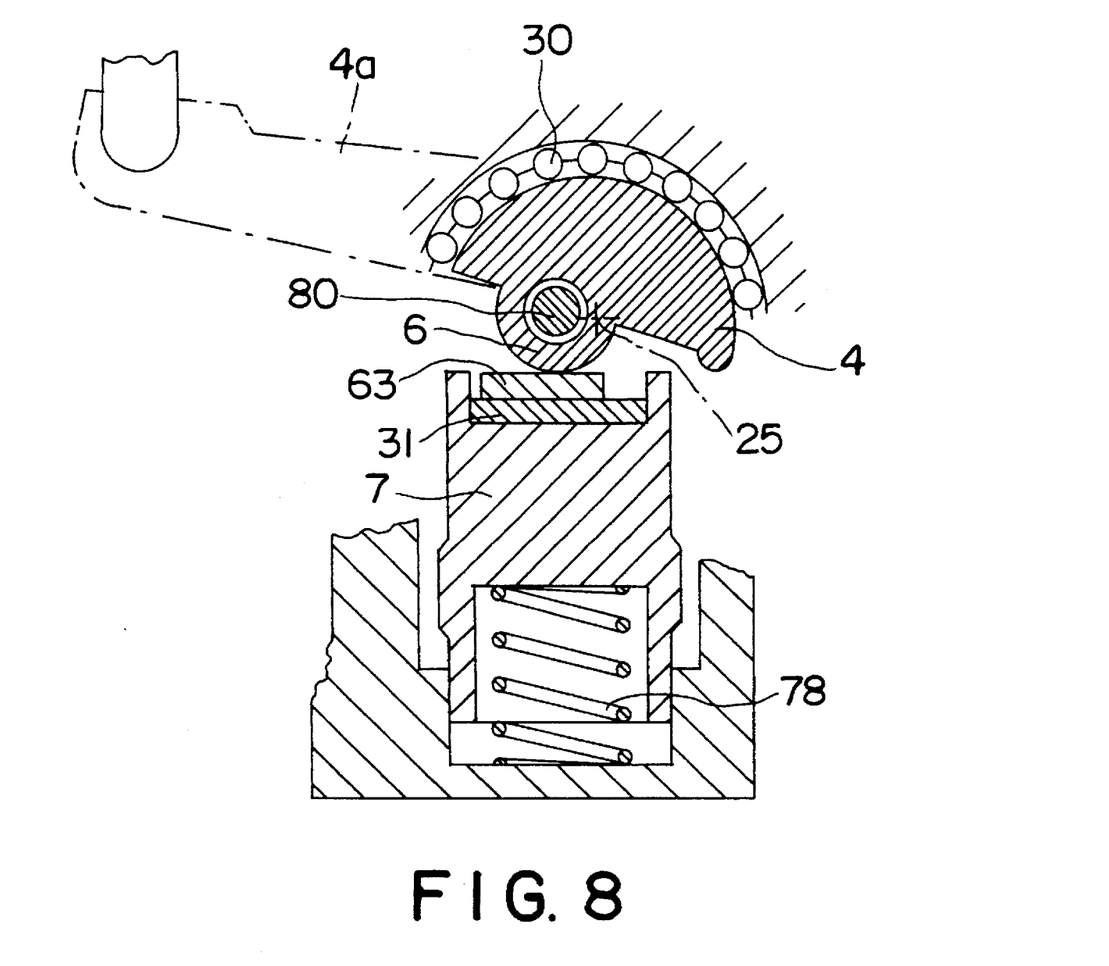

FIGS. 6 to 8 show embodiments of the lever mechanism in which the eccentric 6 is constructed in one piece with the traverse (FIG. 6) or with the rotary lever (FIGS. 7 and 8). In the case of the two latter embodiments, the abutment 31 of the eccentric 6 is therefore constructed in the transverse member 7, in which case, in the embodiment of FIG. 8, in addition, a pressure plate 63, is inserted. The method of operation and special advantageous of the respective further development of the eccentric are explained in detail in the applicant's initially mentioned German Patent Document DE-OS 42 12 384 so that reference is made to this document with respect to details.

In these embodiments of the lever mechanism, a longitudinal bore 85 is provided in the area of the eccentric 6. The longitudinal bore 85 receives a shaft 80 on whose faces, in the same manner as in the embodiment of FIGS. 4 and 5, one bevel gear 91 and 92 respectively is fastened. Concerning its basic method of operation, reference is made to its description. However, on contrast to the embodiment of FIGS. 4 and 5, it should be noted that, in the case of the eccentric 6 constructed in one piece, it is possible to arrange the longitudinal bore 84 not exactly in the center of the eccentric 6 but slightly eccentrically in the direction of the axis of rotation 25 of the rotary lever 4. In an ideal case, it is even possible to place the longitudinal bore 85 precisely in the axis of rotation 25 if this is permitted by the diameter of the eccentric 6 and that of the longitudinal bore. By this arrangement of the longitudinal bore 85, despite the swivelling of the rotary lever 4, the shaft 80 disposed in the eccentric 6 carries out no or only slight changes of position so that the bevel gears are continuously in a precise engagement or move only slightly away from one another. This type of an arrangement of the longitudinal bore 85 of the eccentric 6 is illustrated in the embodiment according to FIG. 7, in which case, if there is sufficient space, the embodiments of FIGS. 6 and 8 can naturally also be modified correspondingly. Thus, for example, in the case of the embodiment of FIG. 6, a position of the longitudinal bore is indicated which is situated approximately in the center of the eccentric 6 and of the axis of rotation 25. Because of the geometry of the eccentric 6 and of the diameter of the longitudinal bore 85, this arrangement represents a good compromise in view of the achievable constancy of the mutual engagement of the bevel gears.

It may be possible to use a plastic material for the bevel gears 81, 82, 91 and 92 so that the manufacturing costs may be reduced. If necessary, a (not shown) slide bearing may be used for the bearing of the shaft 80. In addition, with respect to other advantages and effects of the invention, explicit reference is made to the disclosure of the figures. Although the present invention has been described and illustrated in derail, it is to be clearly understood that the same is by way of illustration and example only, and is not to be taken by way of limitation. The spirit and scope of present invention are to be limited only by the terms of the appended claims.

We claim:

1. A compressed-air-operated disc brake comprising:

a caliper having a pair of brakes on each side of a brake disc;

an application device on a first side of said brake disk operable connected to a transverse member which is slidably guided with respect to the brake disc by a lever which swivels about an axis of rotation parallel to the plane of the brake disc;

first and second adjusting spindle adjustably screwed to the transverse member and acting upon a brake shoe which is displaceably disposed with respect to the brake disc in the caliper on the first side;

at least one adjusting device applying adjustment torque to adjustably rotate the first adjusting spindle during each actuation of the lever;

a synchronizing device operably interconnecting the rotation of the first and second adjusting spindles; and said synchronizing device including a shaft parallel to the lever's axis of rotation and adjacent to the connection of the lever and the transverse member and a first bevel gear on each end of the shaft meshing with a corresponding second bevel gear operably connected to the adjusting spindles to form an angle drive.

2. Disc brake according to claim 1 wherein the second bevel gears are fastened to the adjustment spindles in the axially slidable manner.

3. Disc brake according to claim 1 wherein the first and second bevel gears are made of a plastic material.

4. Disc brake according to claim, 1 including an adjusting device applying adjustment torque to adjustably rotate the second adjusting spindle during each actuation of the lever; and the second bevel gears, are connected to said adjusting devices.

5. Disc brake according to claim 1, wherein said lever and said transverse member are interconnected by an eccentric whose longitudinal axis is parallel to the lever's axis of rotation.

6. Disc brake according to claim 5, wherein the eccentric is a roller which is disposed in the transverse member and in the lever in a shell-shaped bearing; and the eccentric roller is the shaft of the synchronizing device.

7. Disc brake according to claim 6, wherein first bevel gears are constructed in one piece with the eccentric roller.

8. Disc brake according to claim 5, wherein the eccentric is a roller which rests in the transverse member and in the lever in a shell-shaped bearing; and the eccentric roller is tube-shaped and the shaft of the synchronizing device extends through said eccentric roller.

9. Disc brake according to claim 5, wherein the eccentric is constructed in one piece with the transverse member or the lever; and the eccentric includes a longitudinal bore through which shaft of the synchronizing device extends.

10. Disc brake according to claim 9, wherein the longitudinal bore is arranged eccentrically with respect to the longitudinal axis of the eccentric.

11. Disc brake according to claim 5 wherein the shaft is slidably disposed in the longitudinal bore.

12. Disc brake according to claim 9, wherein the longitudinal bore is concentric to the lever's axis of rotation.

13. Disc brake according to claim 1, including a longitudinal bore adjacent to the connection of the lever and the transverse member and the shaft of the synchronizing device extends through the longitudinal bore.

14. Disc brake according to claim 13, wherein the longitudinal bore is concentric to the lever's axis of rotation.

* * * * *

UNITED STATES PATENT AND TRADEMARK OFFICE
CERTIFICATE OF CORRECTION

PATENT NO. : 5,582,273
DATED : December 10, 1996
INVENTOR(S) : Hans Baumgartner and Dieter Bieker It is certified that error appears in the above-indentified patent and that said Letters Patent is hereby corrected as shown below:

On the title page, item [75] Inventors: change "Bicker" to "Bieker".

Signed and Sealed this

First Day of April, 1997

Attest:

BRUCE LEHMAN

Attesting Officer

Commissioner of Patents and Trademarks